(12) United States Patent
Cassagne et al.

(10) Patent No.: US 12,107,535 B2
(45) Date of Patent: Oct. 1, 2024

(54) PHOTOVOLTAIC PLANT

(71) Applicant: TOTAL SE, Courbevoie (FR)

(72) Inventors: Valérick Cassagne, Limours (FR); Frédéric Leroy, Vincennes (FR)

(73) Assignee: TOTAL SE, Courbevoie (FR)

( * ) Notice: Subject to any disclaimer, the term of this patent is extended or adjusted under 35 U.S.C. 154(b) by 0 days.

(21) Appl. No.: 18/077,634

(22) Filed: Dec. 8, 2022

(65) Prior Publication Data
US 2023/0246591 A1    Aug. 3, 2023

Related U.S. Application Data

(63) Continuation of application No. 17/272,166, filed as application No. PCT/EP2019/073202 on Aug. 30, 2019, now abandoned.

(30) Foreign Application Priority Data

Aug. 30, 2018 (FR) ...................................... 1857825

(51) Int. Cl.
*H02S 40/36* (2014.01)
*H01B 7/17* (2006.01)
*H02S 40/34* (2014.01)

(52) U.S. Cl.
CPC ............... *H02S 40/36* (2014.12); *H01B 7/17* (2013.01); *H02S 40/34* (2014.12)

(58) Field of Classification Search
None
See application file for complete search history.

(56) References Cited

FOREIGN PATENT DOCUMENTS

EP       2495767 A1 *   9/2012   ......... H01L 31/0201

* cited by examiner

*Primary Examiner* — Eli S Mekhlin
(74) *Attorney, Agent, or Firm* — McDonnell Boehnen Hulbert & Berghoff LLP

(57) ABSTRACT

The invention relates to a photovoltaic plant (100) comprising: at least one photovoltaic module (1), including at least one junction box (13) placed on a front face of the photovoltaic module (1), via which face the solar rays enter, in proximity to a peripheral edge (4) of said photovoltaic module (1), and at least one DC current cable (15, 17) that conveys the current generated by the at least one photovoltaic module (1), characterized in that it furthermore comprises a protective sheath (5) that is placed, on the front face of the photovoltaic module (1), encircling the junction box (13) and the DC current cable (15, 17), said protective sheath (5) having a cross-section the height of which corresponds at least to the height of the junction box (13) and including a window (57) that is located in the face of the protective sheath (5) that makes contact with the photovoltaic module (1), via which window the junction box (13) protrudes from the protective sheath (5), and a closable longitudinal aperture (51) allowing the junction box (13) and the DC current cable (15, 17) to be accessed.

14 Claims, 6 Drawing Sheets

PHOTOVOLTAIC PLANT

CROSS REFERENCE TO RELATED APPLICATION

This application is a continuation application of Ser. No. 17/272,166, filed Feb. 26, 2021, which is a U.S. national phase of International Application No. PCT/EP2019/073202, filed Aug. 30, 2019, which claims priority to French Patent Application No. 1857825, filed Aug. 30, 2018, all of which are incorporated by reference herein in their entirety.

TECHNICAL FIELD OF THE INVENTION

The present invention relates to a photovoltaic plant, converting solar radiation into electricity, and more particularly relates to the protection of the cabling of such plants.

BACKGROUND OF THE INVENTION

Photovoltaic plants make it possible to supply renewable electricity, without producing carbon dioxide and without consuming fossil fuel. The only costs created by such a photovoltaic plant for the user are the manufacturing cost, the installation cost and the various upkeep costs.

The decrease in these costs makes photovoltaic energy increasingly competitive when it is compared to the other modes of electricity generation.

Manufacturing costs are reduced essentially by the design of the photovoltaic modules of the plant: their manufacturing mode, the materials used, the type of photovoltaic cells used, their cabling, etc. The choice of the support structure of the modules, its design and its dimensions also make it possible to reduce the cost of the photovoltaic plant. To a lesser extent, the choice of the cabling, its material and its arrangement also contributes to reducing the purchase price.

At this time, it would be advantageous to better use the surfaces of existing industrial or commercial buildings, in particular by installing photovoltaic modules on the roofs thereof. Indeed, for the operator of the building, generating electrical energy can create additional revenue or savings and contribute to favoring the economic exploitation of the building.

However, these commercial or industrial buildings are often built for example with a metal or wooden framework which is sized to just meet the technical constraints in terms of load in order to support the roof with insulation as well as a snow load, for example, depending on the construction region.

Now, it is not possible at this time to install certain photovoltaic modules on the roofs of certain buildings due to the weight of these modules, so as not to violate the technical standards in force. Indeed, most of the known photovoltaic modules generally have a glass front face and a metal support frame such that a single photovoltaic panel often weighs more than 12 kg/m2, or even 25 kg/m2 for some models. If the support structures necessary for the installation of the photovoltaic modules are added to this, the result is an additional load of 3 to 15 kg/m$^2$ for a roof.

Thus, it is not possible to equip the large surfaces currently available with photovoltaic modules, particularly old buildings, due to their limited dimensioning in terms of load.

To address this drawback, lightweight or flexible photovoltaic modules are known and encapsulated with laminated resin having a lower production cost, which can be fixed directly on the surface to be used.

Now, at this time, the cables connecting the photovoltaic modules to one another as well as the junction boxes are generally positioned on the rear face of the photovoltaic modules, and are often integrated into raceways or ducts of a support structure of the photovoltaic modules and thus protected from bad weather, climate variations and UV radiation. Indeed, such protection is necessary because the ultraviolet rays can for example make the polymers porous and fragile.

Now, when the lightweight or flexible photovoltaic modules are for example directly fixed on the roof of a commercial or industrial building, all of the cabling and the junction boxes can no longer be on the back side of the photovoltaic module, but must rather be placed on the front and are therefore exposed to the bad weather and the UV radiation.

It is therefore necessary to provide protection for the cabling and the junction boxes which may be effective while allowing easy installation or maintenance.

SUMMARY OF THE INVENTION

In order to at least partially address the aforementioned problems, the invention relates to a photovoltaic plant for generating electrical energy comprising:
  at least one photovoltaic module, including photovoltaic cells connected to at least one junction box positioned on a front face of the photovoltaic module, via which face the solar rays enter, in proximity to a peripheral edge of said photovoltaic module,
  at least one DC current cable that conveys the current generated by the at least one photovoltaic module,
characterized in that it furthermore includes:
  a protective sheath, fixed on the front face of the photovoltaic module, encircling the junction box and the at least one DC current cable, intended to be placed along the peripheral edge of the photovoltaic module close to the at least one junction box, said protective sheath having a cross-section whose height corresponds at least to the height of the junction box and including a window that is located in the face of the protective sheath that makes contact with the photovoltaic module, via which window the junction box protrudes into the sheath, and a closable longitudinal aperture allowing the junction box and the at least one DC current cable to be accessed.

The protective sheath forms additional protection for the cables and the junction boxes. The closable longitudinal aperture allows easy and quick access to the cables and to the junction boxes, while it is easy to install. Since the cross-section of the sheath approximately corresponds in terms of height to the junction boxes, it further makes it possible to minimize the shade projected by the sheath onto the photovoltaic cells.

The sheath protects the cables from water by decreasing the quantity of water falling directly onto the cables, and by preventing standing water. Indeed, the protective sheath guides the water and promotes the flow thereof.

The photovoltaic plant according to the invention can further include one or more of the following features, considered alone or in combination.

The sheath can be at least partially made from a polymer material or from organic fibers, in particular from among the following: EPDM, PVC or chlorofiber, a fluoropolymer, polysilicone, polyester, polyamide, polypropylene, polyethylene, elasthane, aramid.

The closable longitudinal aperture can be formed by two flaps which are superimposed in the closed state of the closable longitudinal aperture.

The flaps can include strips, for one of textile loops, and for the other of textile hooks, forming, when the flaps are superimposed, a mechanical closure of the closable longitudinal aperture.

The closable longitudinal aperture can be formed by two flaps including, at their free end, lips which are in contact in the closed state of the closable longitudinal aperture.

The protective sheath can include a reinforcement forming elastic means which brings the closable longitudinal aperture back into the closed state in the absence of outside action.

The protective sheath can be made from an elastic material having a state of least deformation in which the closable longitudinal aperture is in the closed state.

The protective sheath can be made in two parts: a bottom with an open cross-section on the face opposite the photovoltaic module, bearing the windows, and a cover closing the protective sheath by interlocking with the bottom of the open cross-section.

The protective sheath can have a rectangular cross-section.

The protective sheath can be made up of several longitudinal segments, a segment being associated with a photovoltaic module and including a window for the junction box of the photovoltaic module with which it is associated.

Each segment can include, at one end, a thinner portion intended to cooperate with a wider portion of an adjacent segment.

The protective sheath is closed at least at one of its longitudinal ends by a stopper having a shape which is complementary to the cross-section of the sheath in the closed state of the closable longitudinal aperture.

One of the stoppers can include at least one passage for the at least one DC current cable.

The lower wall of the protective sheath in contact with a photovoltaic module can include at least one flow aperture for the flow of rainwater falling on the surface of the photovoltaic modules.

DESCRIPTION OF THE DRAWINGS

Other advantages and features will appear upon reading the description of the invention, as well as the following figures, among which.

In the figures, the identical elements are identified by the same references.

DETAILED DESCRIPTION OF THE INVENTION

The following embodiments are examples. Although the disclosure refers to one or several embodiments, this does not necessarily mean that each reference relates to the same embodiment, or that the features apply only to one single embodiment. Simple features of various embodiments could also be combined to provide other embodiments.

In the disclosure, some elements or parameters are indexed, for example by the addition of the qualifier "first" or "second," "first," "next" or "last," or by a letter or a figure, etc. This indexing seeks to differentiate the elements relative to one another, and does not indicate any preferential order or chronology for installation.

For example, in general, a photovoltaic module bears reference number 1, whereas a specific photovoltaic module will be designated by 1a, 1b or 1c.

Figure 1:
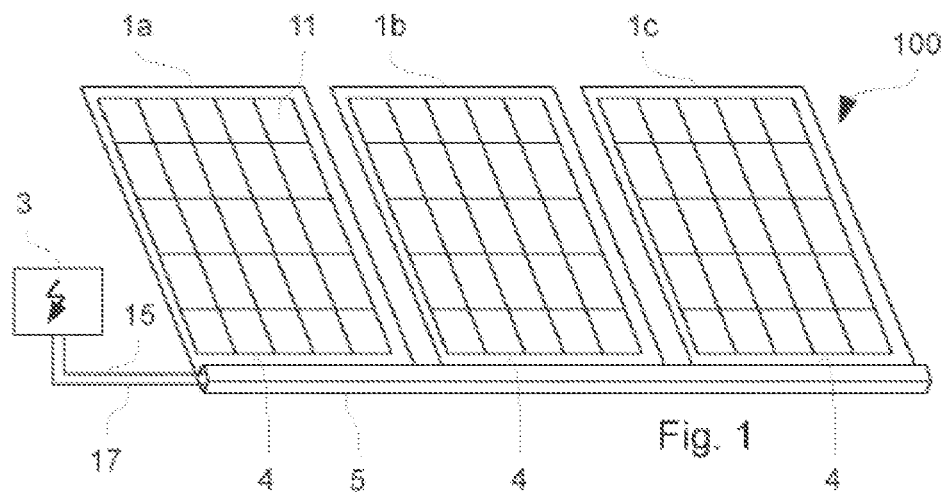
FIG. 1 schematically shows a perspective view of a photovoltaic plant according to the invention, FIG. 2a separately shows a photovoltaic module of the plant of FIG. 1, with its cabling visible and a two-pole junction box, FIG. 2b separately shows a photovoltaic module of the plant of FIG. 1, with its cabling visible and two single-pole junction boxes, FIG. 2c separately shows a junction box and the DC current cables associated therewith.

FIG. 1 is a schematic illustration of the photovoltaic plant 100 according to the invention, in perspective view. The plant 100 of FIG. 1 for example includes three photovoltaic modules 1 (1a, 1b, 1c), connected to a network junction 3, for example a household electrical grid, the public electrical grid or an accumulator.

The photovoltaic modules 1 are for example fixed directly on a roof, a support structure or a heap. The modules 1 are for example interconnected in series so as to form a string using DC current cables 15, 17 conveying the current produced by each of the modules 1 of the string to the network junction 3.

By convention, the first module 1a of the string is closest to the network junction 3, and the last module 1c is the module furthest from the network junction 3.

The three modules 1a, 1b, 1c are positioned horizontally aligned, thus defining a longitudinal axis along which they are connected in series or string. Along one of their peripheral edges, in the present case their lower peripheral edge 4, a protective sheath 5 extends longitudinally, here in particular rectilinear in its longitudinal direction.

The protective sheath 5 encircles the DC current cables 15, 17 and the junction boxes 13. It extends parallel to the lower peripheral edge 4 of the photovoltaic modules 1 along the entire photovoltaic plant 100.

Figure 2A:
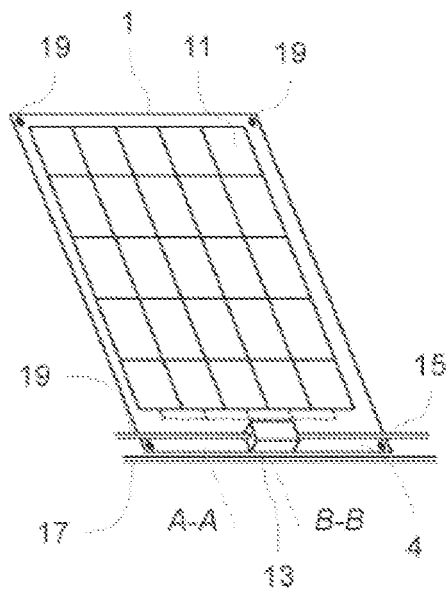

FIG. 2a separately shows a photovoltaic module 1, without the protective sheath 5. The photovoltaic module 1 includes an arrangement of photovoltaic cells 11, arranged in parallel rows and connected by electrical contacts. The photovoltaic cells 11 are for example flexible monocrystalline cells made from silicon, connected by aluminum or silver contacts. The photovoltaic cells 11 can in particular be laminated between two layers of encapsulating resin, with a transparent protective layer on the front face, that is to say, the face by which the sun's rays enter.

The module 1 includes a junction box 13, in the present example a two-pole junction box, on its front face, near the lower peripheral edge 4, with a substantially parallelepipedal shape, in particular with rounded edges. The junction box 13 is connected to the photovoltaic cells by electrical contacts, for example of the same type as those connecting the cells 11 to one another.

Among the DC current cables 15, 17, it is possible to distinguish:

- inter-module connection cables 15 connecting two junction boxes 13 of two adjacent photovoltaic modules, for example 1a and 1b or 1b and 1c, or the network junction 3 to the junction box 13 of the first photovoltaic module 1a,
- a return cable 17, which connects the junction box 13 of the last photovoltaic module to the network junction 3, this return cable 17 running parallel to the connection cables 15 along the entire plant in the protective sheath 5.

The junction box 13 and the connection cable 15 advantageously include plugs and jacks which are complementary for a quick assembly. The return cable 17 connects the positive pole of the last junction box 13 to the positive pole of the network junction 3.

The connection 15 and return cables 17 forming the DC current cables 15, 17 can in particular be fixed by shape cooperation to the poles that they connect, for example to the complementary plug and jack means in order to allow quick installation.

Other arrangements of DC current cables 15, 17 are, however, also possible, in particular with a parallel connection of the junction boxes 13. Such an interconnection of the junction boxes 13 makes it possible to favor the produced current to the detriment of the supplied voltage.

Arrangements combining junction boxes 13 in parallel and in series are also possible in order to adapt current and voltage at the output of the photovoltaic plant.

Figure 2B:
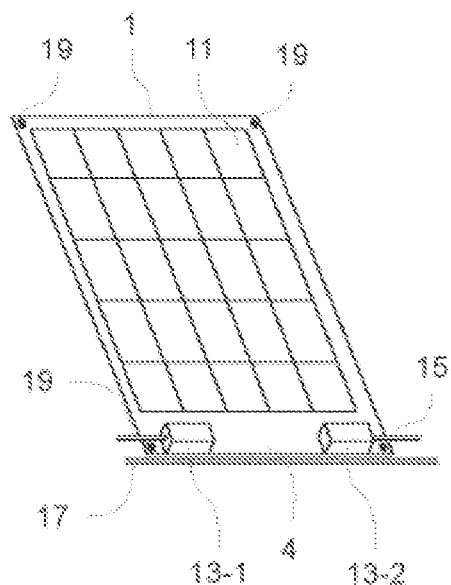

Among possible variants, FIG. 2b separately shows a photovoltaic module of the plant of FIG. 1, with its cabling visible and two single-pole junction boxes 13-1 and 13-2 positioned at the lateral ends of the peripheral edge 4.

Figure 2C:
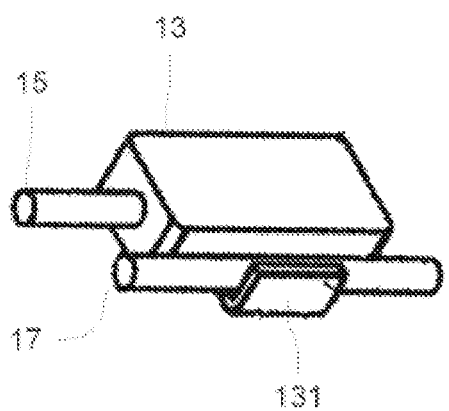

One example of a single-pole or two-pole junction box 13 and the DC current cables 15, 17 is shown in more detail in FIG. 2c. In FIG. 2c, the junction box 13 is shown in perspective view. The junction box 13 is parallelepipedal, with a connection cable 15 connected to it on each side perpendicular to the peripheral edge 4 along which it is positioned.

A separate return cable 17 extends on the side of the junction box 13 facing the close peripheral edge 4. The return cable 17 can alternatively be positioned on the side opposite the junction box 13 or, in the context of a modular structure, be combined with the connection cable 15, which then includes two parallel lines. The junction box 13 here in particular includes a hook 131 in order to keep the return cable 17 on its face oriented toward the peripheral edge 4 along which it is positioned.

The module 1 further includes fixing means 19 (FIG. 2a), for example piercings allowing screwing, hooking or quick fastening to a dedicated support structure or bearings fixed to a roof or a heap. According to other embodiments, the photovoltaic modules are fixed by gluing on the support structure.

Figure 3A:
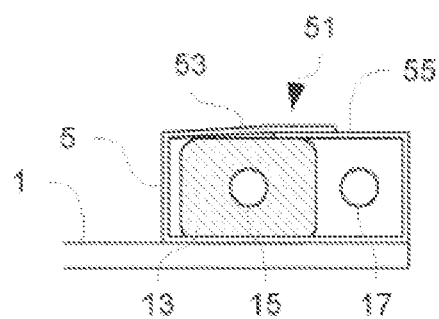
FIG. 3a, 3b are cross-sectional views of a lower portion of the module of FIG. 2a with a sheath, FIG. 4a schematically shows a perspective view of a sheath for protecting the cabling of FIG. 2a, FIG. 4b schematically shows a perspective view of a sheath for protecting the cabling of FIG. 2b, FIGS. 5 to 8 show cross-sections of different sheath embodiments.
Figure 3B:
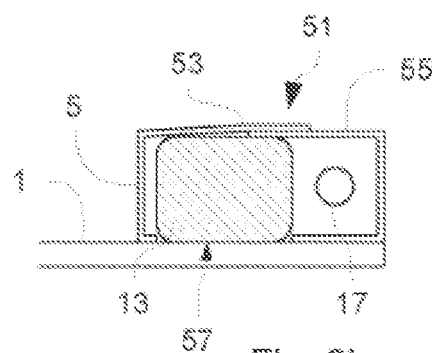

FIGS. 3a and 3b show a cross-sectional view of a first embodiment of a protective sheath 5.

This protective sheath 5 is mounted and fixed so as to surround the junction box 13 and the connection 15 and return cables 17.

In FIG. 3a, the section plane is the plane perpendicular to the plane of the module and to the lower edge 4 of the module 1 passing through line A-A which is located to the left of a junction box 13.

In FIG. 3b, the section plane is the plane perpendicular to the plane of the module and to the lower edge of the module 1 passing through the line B-B which is located in the middle of the junction box 13.

In this embodiment, the protective sheath 5 has a rectangular cross-section, with a height corresponding at least or exactly to the height of the junction box 13. It therefore contains and encircles said junction box 13 as well as the connection 15 and return cables 17, shown by their profile or their cross-section: rectangular with rounded edges for the junction box 13, circular for the cables 15, 17.

The protective sheath 5 can be rigid or flexible. It is for example at least partially made from polymer material or from organic fibers, in particular from among the following: EPDM, PVC or chlorofiber, a fluoropolymer, polysilicone, polyester, polyamide, polypropylene, polyethylene, elasthane, or even aramid. The protective sheath 5 can alternatively be made from braided polyamide yarns. In particular, it does not need to be completely tight, since its primary aim is to stop the ultraviolet rays from the sun. On the contrary, partial tightness can even reduce the accumulation of moisture for long periods.

If the protective sheath 5 is made from insulating polymers, a destroyed yarn whose core is in contact with said protective sheath 5 then does not make its manipulation or contact dangerous for a human operator.

By adapting the height of the protective sheath 5 to that of the junction box 13, the shadow projected by the protective sheath 5 onto the photovoltaic cells 11 is reduced, which makes it possible to retain a high efficiency of the plant 100 despite an installation of cable and junction boxes 13 on the front face of the photovoltaic modules 1.

The protective sheath 5 includes a longitudinal aperture 51 which preferably extends over its entire length and which is closable. In the present example, this longitudinal aperture 51 is positioned on its face opposite the module 1, here closed by a first 53 and a second 55 flap. The first flap 53 folds down on the second flap 55 in order to close said aperture 51. The flaps 53, 55 can in particular fold down into the position closing the closable longitudinal aperture 51 under the action of a return to a state of least deformation of the elastic material which makes up the protective sheath 5. In addition or alternatively, the protective sheath 5 can include an elastic reinforcement, for example made from spring steel or elastic plastic, which forms elastic means ensuring that the closable longitudinal aperture 51 returns to the closed state in the absence of outside action.

The first flap 53 is then advantageously located on the top side when the module 1 is considered inclined or vertical, in order to allow a better discharge of rainwater outside the protective sheath 5.

There is located, on the face of the protective sheath 5 located in contact with the front face of the photovoltaic module 1 in the mounted state, a window 57 for each junction box 13, at the longitudinal positions of said junction boxes 13, by which the junction boxes 13 protrude into the protective sheath 5. One such window 57 is in particular visible only in FIG. 3b, corresponding to a cross-section at the position of a junction box 13 and therefore at the height of a window 57 and at the junction box 13 whose profile is visible in FIGS. 3a and 3b.

The protective sheath 5 can also be fixed on the front face of the modules 1, for example by gluing, by screwing, by riveting or by shape matching ("clipping").

The windows 57 and the closable longitudinal aperture 51 are located on different faces, here opposite faces. The windows 57 in particular have a shape and dimensions which correspond to the junction boxes 13, so as to allow the passage in the protective sheath 5. The closable longitudinal aperture 51 allows quick access to the junction boxes 13 and to the cables 15, 17 contained and protected by the protective sheath 5 in the closed state of said closable longitudinal aperture 51.

Figure 4A:
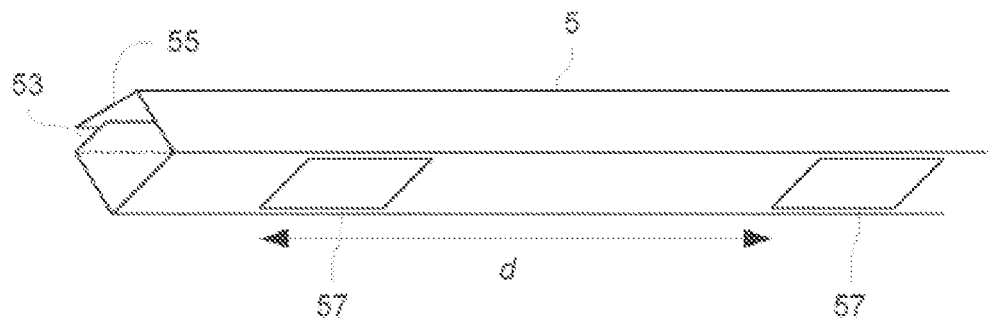
Figure 4B:
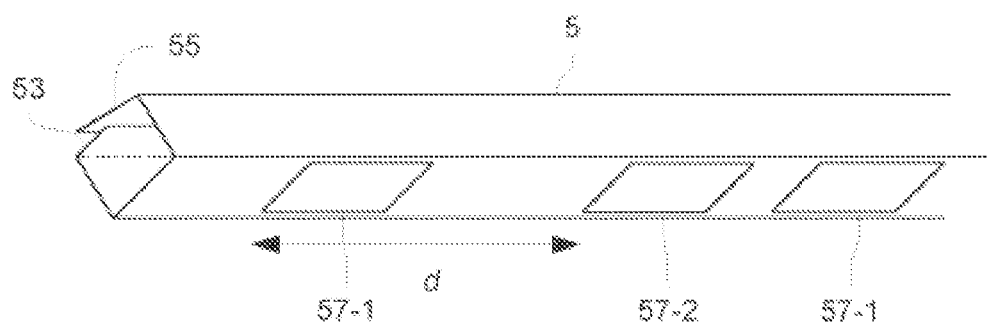

The protective sheath 5 is shown in bottom perspective view (from the location normally occupied by the photovoltaic module 1) in FIG. 4a for modules shown in FIG. 2a and in FIG. 4b for the modules shown in FIG. 2b.

Figure 9:
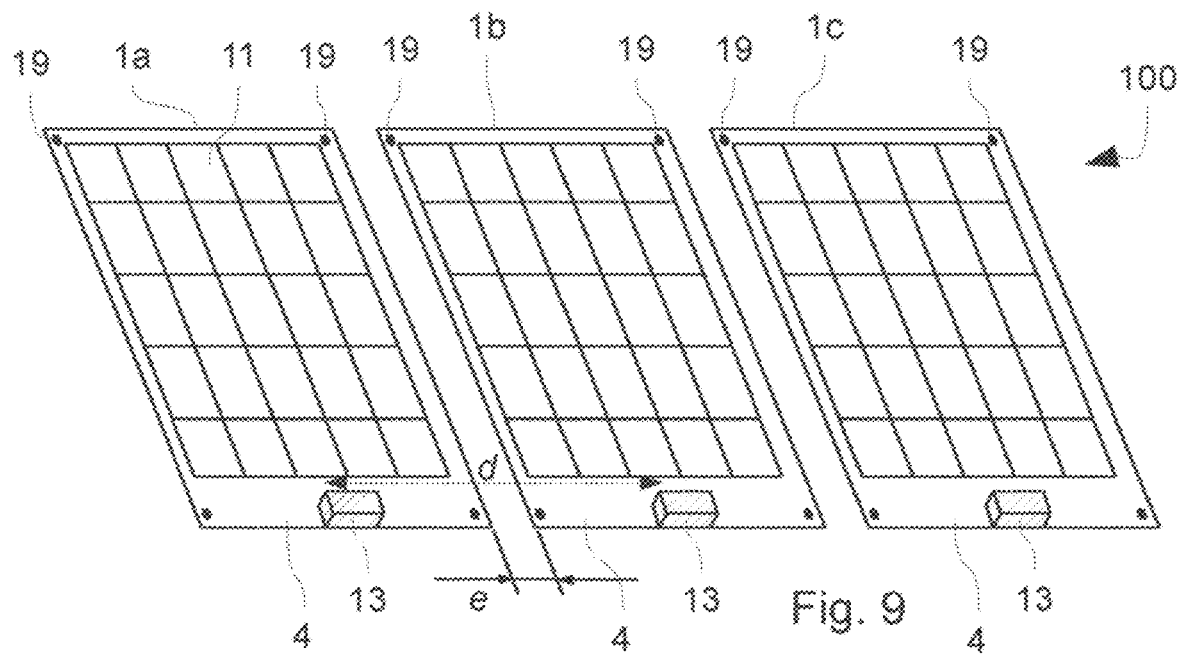
FIGS. 9 to 11 illustrate the installation of a plant according to one embodiment of the invention.

FIG. 4a, respectively 4b in particular show that the windows 57, respectively 57-1 and 57-2, are positioned at a distance d corresponding to the distance between two junction boxes 13 (two-pole), respectively 13-1 and 13-2 (single-pole), of two successive modules 1 of the photovoltaic plant 100 (see FIG. 9).

The sheath 5 is in particular held by the interlocking of the windows 57, respectively 57-1 and 57-2, on the junction boxes 13, respectively 13-1 and 13-2, and the passage of the cables 15 and 17 in the sheath 5.

FIGS. 5 to 8 illustrate alternative embodiments of a closable longitudinal aperture 51, with a representation mode similar to that of FIG. 3a, 3b.

Figure 5:
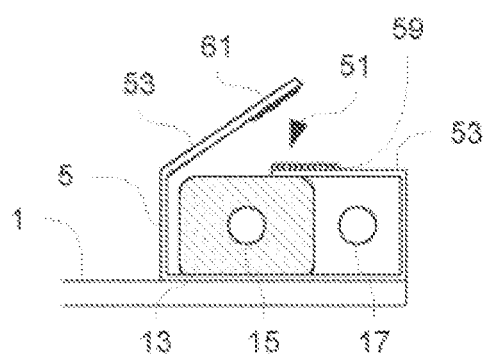

In FIG. 5, the closable longitudinal aperture 51 is formed by two flaps 53, 55, further including strips of loops 59 and textile hooks 61, forming, in the closed state, a reversible fastener of the "scratch" type.

Figure 6:
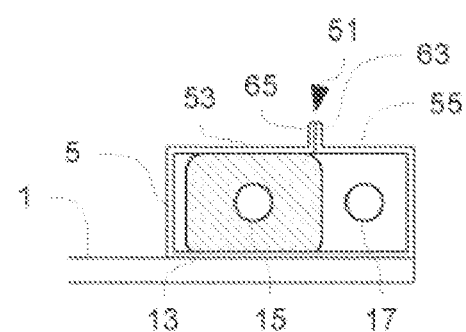

In FIG. 6, the closable longitudinal aperture 51 is formed by two flaps 53, 55 extended by two end lips 63, 65, respectively at the free end of the first and the second flap 53, 55, in compressed contact when said aperture 51 is in the closed state.

Figure 7:
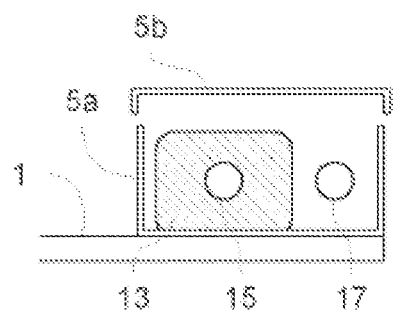

In FIG. 7, the protective sheath is formed by two longitudinal parts. It in particular includes a bottom 5a, with an open cross-section on the face opposite the photovoltaic module 1, and a cover 5b closing the protective sheath 5 by interlocking with the bottom 5a of open cross-section which it closes.

Figure 8:
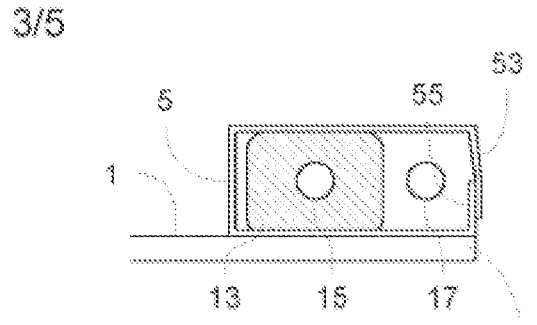

In FIG. 8, the protective sheath 5 includes the closable longitudinal aperture 51 on the face oriented toward the peripheral edge 4, which can be advantageous when said peripheral edge 4 is a lower edge: the flow of water through said aperture 51 is then reduced, while the flow of water from the inside of the protective sheath 5 is increased. Conversely, if the peripheral edge 4 is an upper edge, the closable longitudinal aperture 51 can be positioned on the opposite face, facing the photovoltaic cells 11.

A protective sheath 5 as previously described in particular is lightweight, makes it possible to cover and protect the DC current cables 15, 17, the connectors 18 (not visible in FIG. 8) as well as the junction boxes 13, while allowing easy and quick access to the latter during upkeep or an inspection of the condition of the components of the photovoltaic plant 100.

FIGS. 9 to 11 and 12a, 12b illustrate the method for installing the photovoltaic plant 100, for example on a roof or on inclined terrain.

The first step shown in FIG. 9 is the aligned positioning of the photovoltaic modules 1, with a gap e between two consecutive modules (e in particular being able to be zero) ensuring a distance d between the junction boxes 13 of two consecutive photovoltaic modules 1. The photovoltaic modules 1 are in particular fixed by their fixing means 19 to the support (here the roof or inclined terrain), using screws, fasteners or hooks or by gluing.

Figure 10:
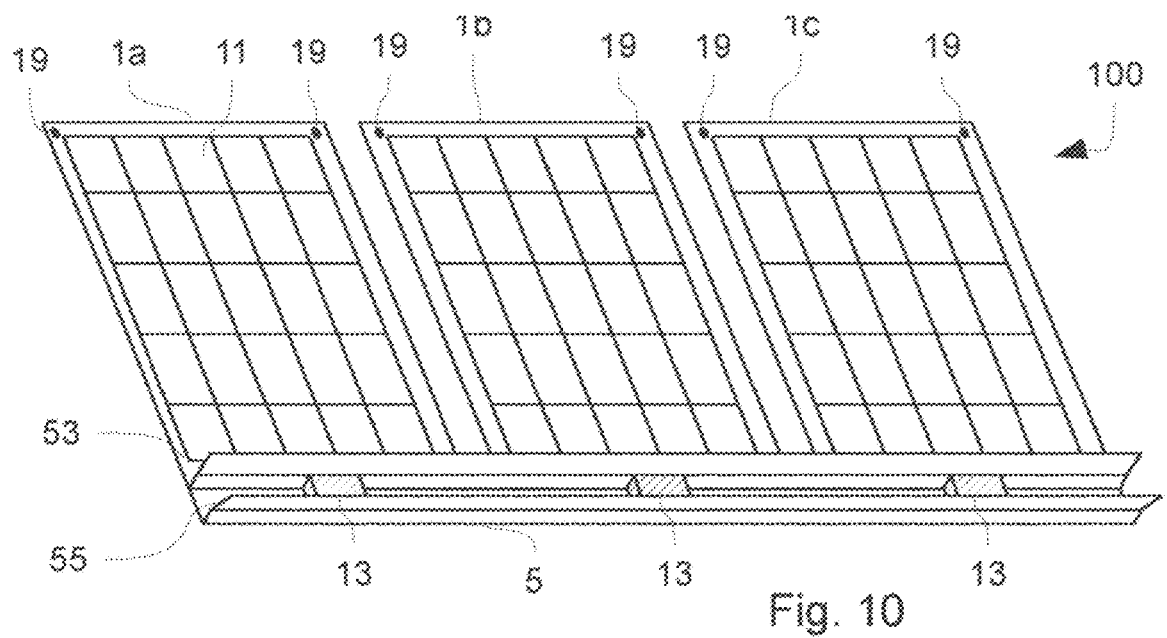
Figure 11:
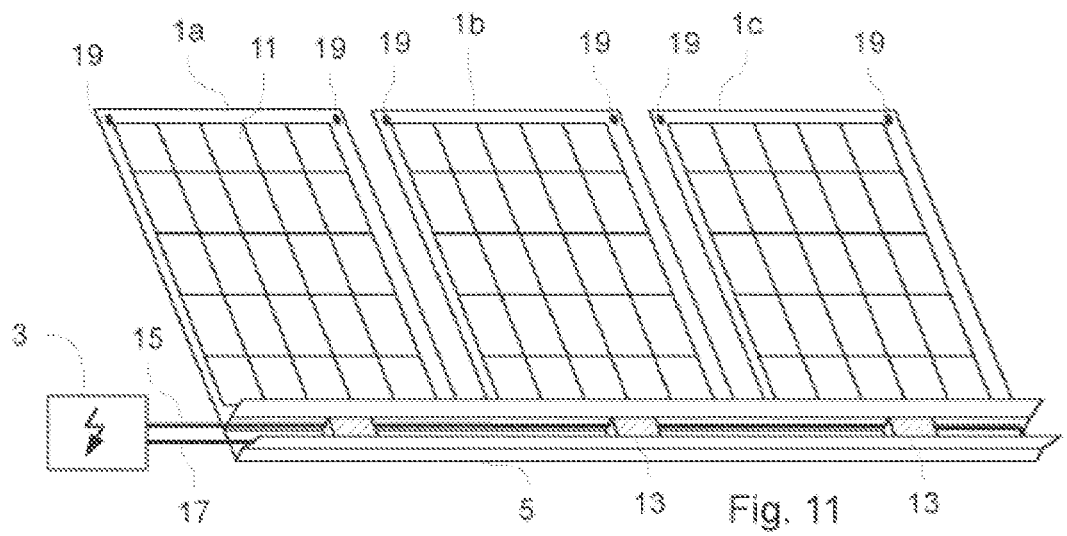

The second step shown in FIG. 10 is the arrangement and the fixing of the protective sheath 5 along the peripheral edges 4 aligned near the junction boxes 13, with said junction boxes 13 protruding in the windows 57. The protective sheath 5 can in particular be fixed by gluing. In the case of FIG. 10, the protective sheath 5 is level with a row of fixing means 19 of the modules 1, and can therefore be fixed by the latter.

The third step is the connection of the photovoltaic modules 1 to one another and to the DC current network junction or to the power converter 3, using the DC current cables 15 and 17. To this end, the connection cables 15 are positioned between the successive junction boxes 13 of the modules 1a, 1b, 1c of the string, for example, the first junction box 13 being connected by its negative pole to a negative pole of the network junction 3, and the return cable 17 is positioned between the positive pole of the last junction box 13 and the positive pole of the network junction 3.

The closable longitudinal aperture 51 is then closed again, and plant is priest to operate.

During an inspection or upkeep, an operator needs only to open the closable longitudinal aperture 51 in order to access the DC current cables 15, 17 and the junction boxes 13, for example to inspect the condition of the equipment items or to measure the voltage across the terminals of a junction box 13 in order to determine which segment of DC current cable 15, 17 or which photovoltaic module 1 must be replaced.

Figure 12A:
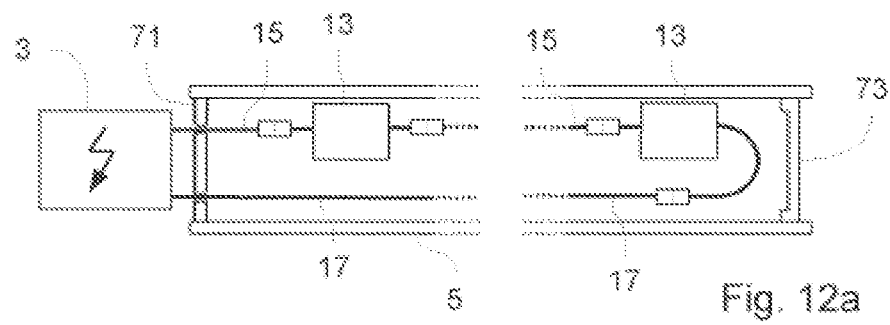
FIGS. 12a and 12b illustrate a possibility for closing the ends of the sheath with modular cabling.
Figure 12B:
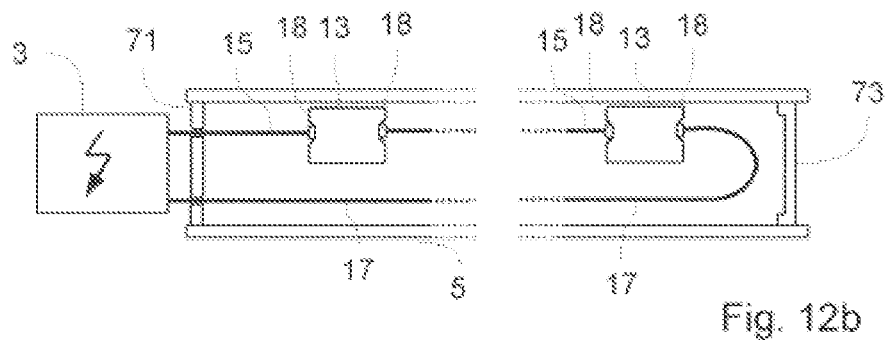

In order to more completely close the volume delimited by the protective sheath 5, in particular with respect to outside objects (leaves, gravel, insects and animals, etc.), stoppers 71, 73 with a cross-section corresponding to that of the protective sheath 5 in the closed state can be positioned and fixed at the longitudinal ends of the protective sheath 5, as shown in FIG. 12a, 12b. Advantageously, these stoppers 71, 73 include cable passages, connections to other ducts or raceways or outlets or plugs for the DC current cables 15, 17. They can in particular be glued, stapled or sewn to the ends.

In the context of a modular structure, with quick and easy assembly, the connection 15 and return cables 17 are provided with connectors 18, for example plugs and outlets which are interconnected and which thus maintain electrical contact, in particular by shape cooperation. In particular, the connectors 18 can connect the DC current cable portions 15, 17 reversibly, in order to allow quick replacement.

In the case of FIG. 12a, a portion of the DC current cables 15, 17 is fixedly connected to the junction boxes 13, and connectors are provided between the consecutive junction boxes 13.

In the case of FIG. 12b, the connectors are integrated into the junction boxes 13, in particular in the form of female outlets flush at the sides of said junction boxes 13, so as to maintain a rectangular contour allowing the insertion of the junction boxes 13 into the windows 57, which in turn are rectangular.

The DC current cables 15, 17 and the junction boxes 13 are then connected by the connectors 18 simply, quickly and reversibly. The assembly of the plant 100 is then quicker and potentially less expensive, while the maintenance and in particular the replacement of components (module 1a, 1b, cable segment, etc.) is then simplified.

Alternatively, the ends of the protective sheath 5 can be sewn around the DC current cables 15, 17.

Figure 13:
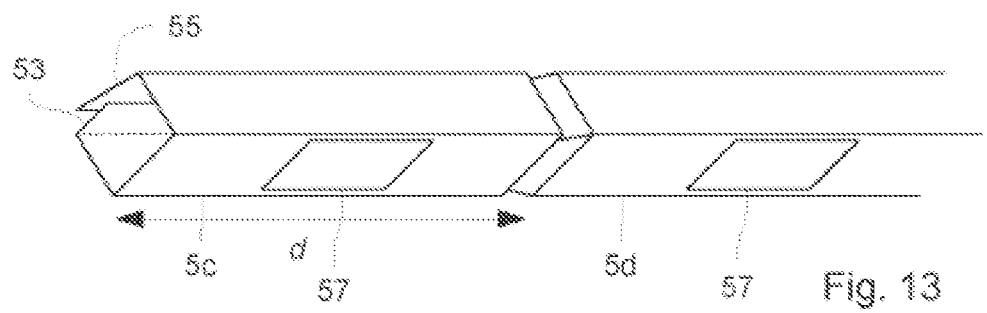
FIGS. 13 and 14 illustrate a modular embodiment of the sheath, in bottom view and cross-sectional view, respectively.

In the context of a modular structure, not requiring any cutting of a particular length of protective sheath 5, said protective sheath 5 can be made up of several longitudinal segments 5c, 5d, etc., a longitudinal segment 5c, 5d for example being associated with a photovoltaic module 1 and including a window 57 (or two windows 57-1 and 57-2). Such a protective sheath 5 is shown in FIGS. 13 and 14.

Each segment 5c, 5d includes, at one end, a thinner portion intended to cooperate with a wider portion of the following or preceding segment in the string. FIG. 14 is a perspective view from below (similar to FIG. 4). Each protective sheath 5c, 5d then has a total length d when it is interlocked in the adjacent segment 5d, 5c. The interlocking of the sheaths can also be done by conical shapes or flanges or also by elastic deformation of the mouths.

Figure 14:
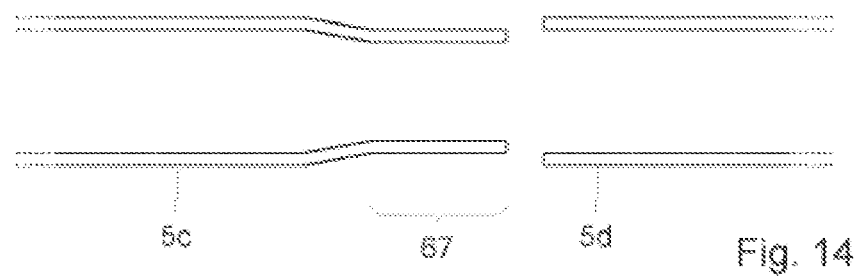

In FIG. 14, the segments are shown in cross-section, so as to make visible a thinner portion 67 of the considered segment 5c, which is interlocked in the end of the adjacent segment 5d during the installation of the plant 100.

Alternatively, the protective sheath 5 can assume a continuous form, for example the form of an unwinding roller when it is flexible enough (braided polymer yarns or a polymer membrane), and in particular without the windows 57. For the installation of the plant 100, it is then necessary to cut, on the one hand, the required length of protective sheath 5, and on the other hand, the windows 57 in the appropriate locations. Although it requires more steps, this installation method provides greater freedom regarding the arrangement of the modules 1.

Figure 15:
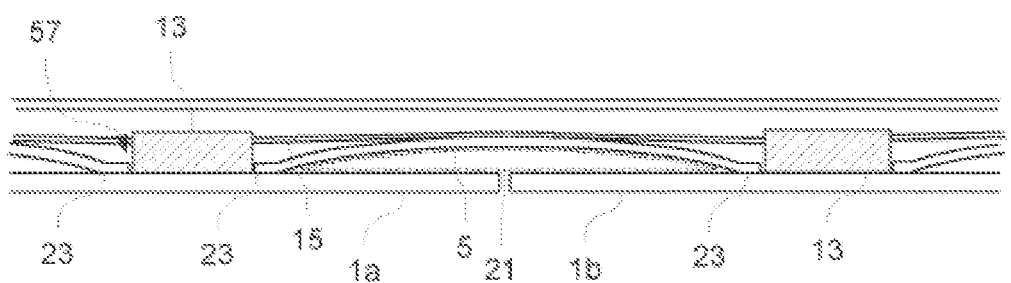
FIGS. 15 and 16 illustrate an embodiment with a flow window.
Figure 16:
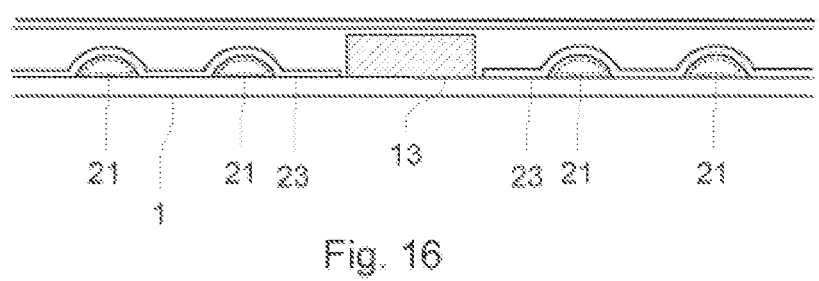

Since the lightweight modules are often installed in the direction of the inclined part of the roofs or the heap, the electrical connections and sheaths will be located perpendicular to the incline and therefore can provide a dam for the flow of rainwater. FIGS. 15 and 16 illustrate one embodiment of a protective sheath 5 and photovoltaic plant 100 in which the protective sheath 5 includes flow apertures 21, passing through the protective sheath 5 in the direction perpendicular to its longitudinal axis, at its lower surface (that which is against the photovoltaic module 1).

In the embodiment of FIG. 15, the lower wall of the protective sheath 5, that which is positioned against the photovoltaic modules 1a, 1b and which forms a bottom of said protective sheath 5, is bowed between the junction boxes 13, while the photovoltaic modules 1a, 1b are rectilinear. Thus, flow apertures 21 allow the flow of rainwater falling on the surface of the considered photovoltaic module 1a, 1b.

Around the windows 57 through which the junction boxes 13 are inserted, connected by the DC current cable 15, the protective sheath 5 includes frames 23, in the form of a flat rectilinear portion of the bottom of the protective sheath 5 positioned against the photovoltaic module 1. The frames 23 encircle the windows 57, and are parallel to the photovoltaic module 1a, 1b of the junction box 13 which they encircle.

At the frames 23, the protective sheath 5 can be glued on the module 1. Alternatively, the protective sheath 5 can be screwed, riveted or stapled at the frame 23 against the photovoltaic module 1a, 1b.

In the embodiment of FIG. 16, the protective sheath 5 includes several bowed portions each delimiting a flow aperture 21 between two successive junction boxes 13.

The flow apertures 21 thus make it possible to avoid standing water at the junction boxes 13, and thus reduce soiling at the sheath 5 and of its content.

The protective sheath 5 can also be non-rectilinear in its longitudinal direction, which is easily obtained using a protective sheath 5 made from braided yarns of polyamide, polyethylene or polyvinyl (or other polymers), for example in order to connect nonaligned modules 1 (for example in the case of a curved heap).

The cross-section of the protective sheath 5 can also be different from a rectangle; for example when it is made from braided polymer yarns or from polymer membrane, it will have an ovaloid cross-section.

The protective sheath 5 makes it possible to prevent the stagnation and accumulation of water at the DC current cables 15, 17 by encouraging the discharge thereof.

The addition of the protective sheath 5 therefore makes it possible to increase the life expectancy in the operating state of the photovoltaic plant 100 by protecting the DC current cables 15, 17, the connectors 18 (FIG. 12a, 12b) and the junction boxes 13 of the junction modules 1 on the front face. It is easy and quick to install, while it can be made from inexpensive materials, thus representing a low extra cost. It therefore contributes to making photovoltaic energy more efficient and competitive.

The invention claimed is:

1. A photovoltaic plant for generating electrical energy comprising:
   at least one photovoltaic module, including photovoltaic cells connected to at least one junction box positioned on a front face of the photovoltaic module, via which face the solar rays enter, in proximity to a peripheral edge of said photovoltaic module,
   at least one DC current cable that conveys the current generated by the at least one photovoltaic module,
   characterized in that the photovoltaic plant furthermore includes:
   a sheath, fixed on the front face of the photovoltaic module, encircling the junction box and the at least one DC current cable, intended to be placed along the peripheral edge of the photovoltaic module close to the junction box, said sheath having a cross-section whose height corresponds at least to the height of the junction box and including a window that is located in the face of the sheath that makes contact with the photovoltaic module, via which window the junction box protrudes into the sheath, and a closable longitudinal aperture allowing the junction box and the at least one DC current cable to be accessed,
   characterized in that the sheath includes a reinforcement forming elastic means which brings the closable longitudinal aperture back into the closed state.

2. The photovoltaic plant according to claim 1, characterized in that the sheath is at least partially made from a polymer material or from organic fibers.

3. The photovoltaic plant according to claim 2, wherein the polymer material or organic fibers comprise EPDM, PVC or chlorofiber, a fluoropolymer, polysilicone, polyester, polyamide, polypropylene, polyethylene, elasthane, aramid, or combinations thereof.

4. The photovoltaic plant according to claim 1, characterized in that the closable longitudinal aperture is formed by two flaps which are superimposed in the closed state of the closable longitudinal aperture.

5. The photovoltaic plant according to claim 4, characterized in that the flaps include strips, for one of textile loops, and for the other of textile hooks, forming, when the flaps are superimposed, a mechanical closure of the closable longitudinal aperture.

6. The photovoltaic plant according to claim 1, characterized in that the closable longitudinal aperture is formed by two flaps including, at their free end, lips which are in contact in the closed state of the closable longitudinal aperture.

7. The photovoltaic plant according to claim 1, characterized in that the sheath is made from an elastic material having a state of least deformation in which the closable longitudinal aperture is in the closed state.

8. The photovoltaic plant according to claim 1, characterized in that the sheath is made in two parts: a bottom with an open cross-section on the face opposite the photovoltaic module, bearing the windows, and a cover closing the sheath by interlocking with the bottom of open cross-section.

9. The photovoltaic plant according to claim 1, characterized in that the sheath has a rectangular cross-section.

10. The photovoltaic plant according to claim 1, characterized in that the sheath is made up of several longitudinal segments, a segment being associated with a photovoltaic module and including a window for the junction box of the photovoltaic module with which it is associated.

11. The photovoltaic plant according to claim 10, characterized in that each segment includes one end a thinner portion intended to cooperate with a wider portion of an adjacent segment.

12. The photovoltaic plant according to claim 1, characterized in that the sheath is closed at least at one of its longitudinal ends by a stopper.

13. The photovoltaic plant according to claim 12, characterized in that at least one stopper includes at least one passage for the at least one DC current cable.

14. The photovoltaic plant according to claim 1, characterized in that the lower wall of the sheath in contact with a photovoltaic module has at least one flow aperture for the flow of water falling on the surface of the photovoltaic modules.

* * * * *